United States Patent [19]
Kupke

[11] Patent Number: 5,891,335
[45] Date of Patent: Apr. 6, 1999

[54] FILTRATION SYSTEM WITH TRAVELING PLENUM

[75] Inventor: John A. Kupke, Annapolis, Md.

[73] Assignee: Agency Environmental, Inc., Hanover, Md.

[21] Appl. No.: 583,173

[22] Filed: Jan. 4, 1996

[51] Int. Cl.$^6$ .................................................. B01D 24/46
[52] U.S. Cl. .......................... 210/273; 210/271; 210/275
[58] Field of Search ..................................... 210/170, 270, 210/271, 407, 409, 273, 275

[56] References Cited

U.S. PATENT DOCUMENTS

| | | | |
|---|---|---|---|
| 2,302,449 | 11/1942 | Laughlin | 210/271 |
| 3,239,061 | 3/1966 | Horning et al. | |
| 3,291,311 | 12/1966 | Pratt et al. | 210/289 |
| 3,625,365 | 12/1971 | Armstrong | 210/289 |
| 3,685,657 | 8/1972 | Hunter et al. | 210/289 |
| 4,152,265 | 5/1979 | Meyers | |
| 5,234,600 | 8/1993 | Kupke | |
| 5,527,456 | 6/1996 | Jensen | 210/170 |

*Primary Examiner*—Robert J. Popovics
*Attorney, Agent, or Firm*—Fulbright & Jaworski LLP

[57] ABSTRACT

A completely new type of filtration system uses a traveling plenum that travels through granular filtration media in a filter tank and backwashes a portion of the media a little at a time. A pump forces backwash water into the traveling plenum, and porous plates mounted on the top of the plenum allow the water to come to the surface of the media and loosen solids deposited at the surface during a filtration cycle. A washwater hood and waste water pump removes the loosened solids from the surface of the media. Porous plates mounted on the sides of the traveling plenum allow backwash water to fluidize surrounding media and promote the transportation of the traveling plenum in the media. Thus, filter construction is reduced to creating a tank with influent and effluent openings without the complicated cell and plenum construction of conventional traveling bridge filters. Effluent plugs, installed across effluent openings, are designed to allow water to exit the tank but retain media inside the tank. The traveling plenum filter maintains the advantages of the low flow rates and low volumes of backwash water commonly found in traveling bridge filter systems.

18 Claims, 7 Drawing Sheets

FILTRATION SYSTEM WITH TRAVELING PLENUM

BACKGROUND OF THE INVENTION

Field of the Invention

The present invention relates to filter systems. More particularly, this invention is directed toward a completely new type of filtration system with a traveling plenum for use in granular filtration media systems. This filtration system can be used in place of conventional traveling bridge filter systems and conventional non-traveling bridge filter systems.

Discussion of the Related Technology

Traveling bridge filter systems are well known in the field of waste water management. These systems are exemplified in U.S. Pat. No. 3,239,061, U.S. Pat. No. 4,152,265, and U.S. Pat. No. 5,234,600. Conventional non-traveling bridge filter systems backwash the entire filter area, thus requiring large flow rates and large volumes of backwash water. Traveling bridge filters minimize the area of the filtration media being cleansed by using a cell structure. A cell structure reduces the amount of waste by-product, which is directly proportional to the area of the filtration media being cleansed. Commonly, sand is used as a filtration media, but other materials such as anthracite, garnet, or carbon, may also be used.

SUMMARY OF THE INVENTION

The present invention provides a completely new type of filtration system. Instead of dividing an underdrain into a plurality of cells, which are then backwashed one by one, the filtration system with traveling plenum uses a washwater hood and traveling plenum that travels through the granular filtration media and backwashes a portion of the media a little at a time. Thus, filter construction is reduced to creating a tank with influent and effluent openings without the complicated cell and plenum underdrain construction of conventional traveling bridge filters. The traveling plenum filter, however, maintains the advantages of the low flow rates and low volumes of backwash water commonly found in traveling bridge filter systems.

An advantage of the traveling plenum filter is that it eliminates the expense and time required to construct plenum sections for use in a waste water filters. Another advantage is that low flow rates and low volumes of backwash water are required. Yet another advantage is that backwashing of the media may be precisely controlled due to the continuous nature of the traveling plenum.

DETAILED DESCRIPTION OF THE PREFERRED EMBODIMENT

Figure 1:
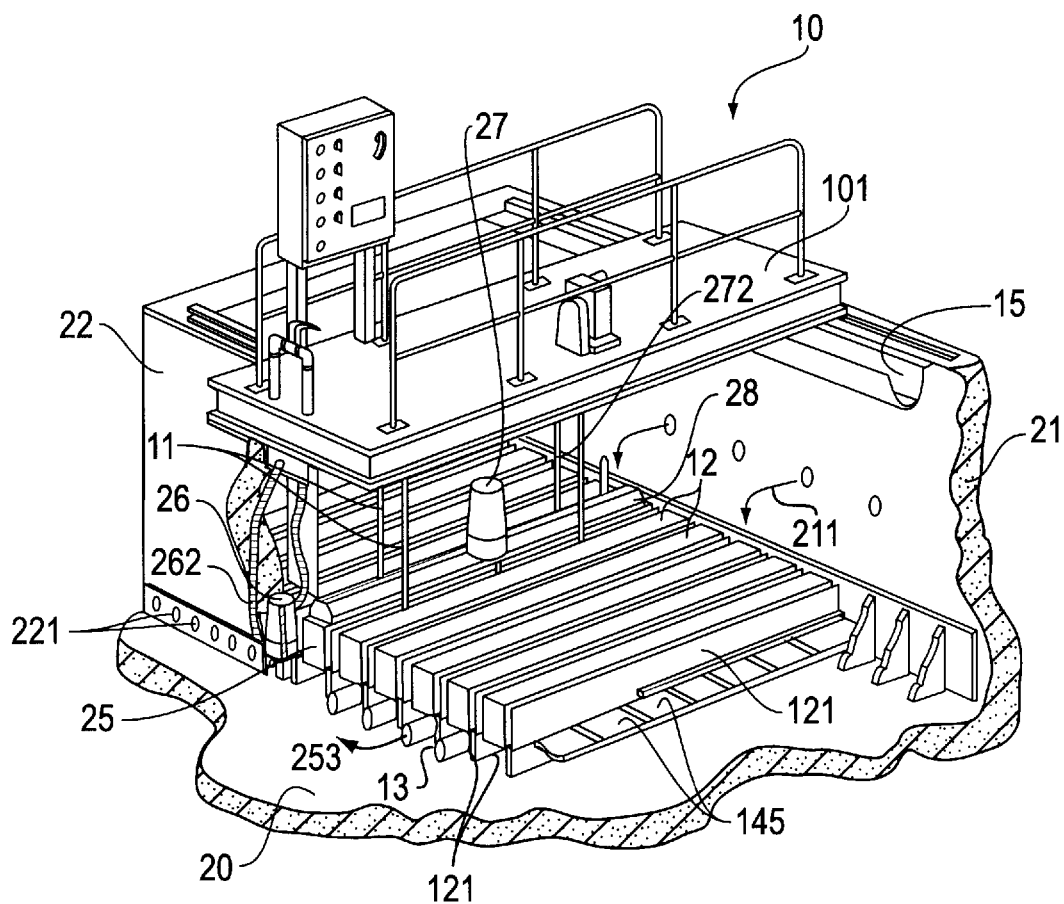
FIG. 1 shows a perspective view illustrating a typical prior art traveling bridge filter.

FIG. 1 shows a perspective view illustrating a typical prior art traveling bridge filter 10. A concrete tank having a slab 20, influent wall 21, and effluent wall 22, contains a plenum section 13 having a plurality of cells 12 separated by cell dividers 121. Media 25 is placed on media retention plates 145 in each cell of the plenum section. Traveling bridge 101 travels along tracks 15 installed at the top of the influent and effluent walls.

In both the prior art and the present filter systems, during filtering, influent water is delivered to the filter compartment through influent openings 211 in the influent wall 21. The influent water maintains a level over the surface of the granular filter media 25 such that the downward flow of influent water is more or less uniform across the entire surface area of the filter media. Solids in the influent water are deposited on the surface of the media 253, and the filtered water enters through the media retention plates 145 at the top of the plenum section 13 and exits through filtrate effluent openings 221 installed in the effluent wall 22.

During backwashing of the prior art traveling bridge filter, backwash water pump 26 located near filtrate effluent openings 211 forces backwash water into a particular cell of the plenum section 13 through a filtrate effluent opening. The water is forced up through the media retention plates 145 of the cell, and it loosens solids from the surface of the media 253. Waste water pump 27 mounted on washwater hood 28 removes the loosened solids, suspended in the backwash water, at the surface of the media 253 via a waste water pipe in the hood. Traveling bridge 101 and supports 11 are used to transport backwash water pump 26, waste water pump 27, and washwater hood 28 from one cell to the next cell during the backwash cycle.

Figure 2:
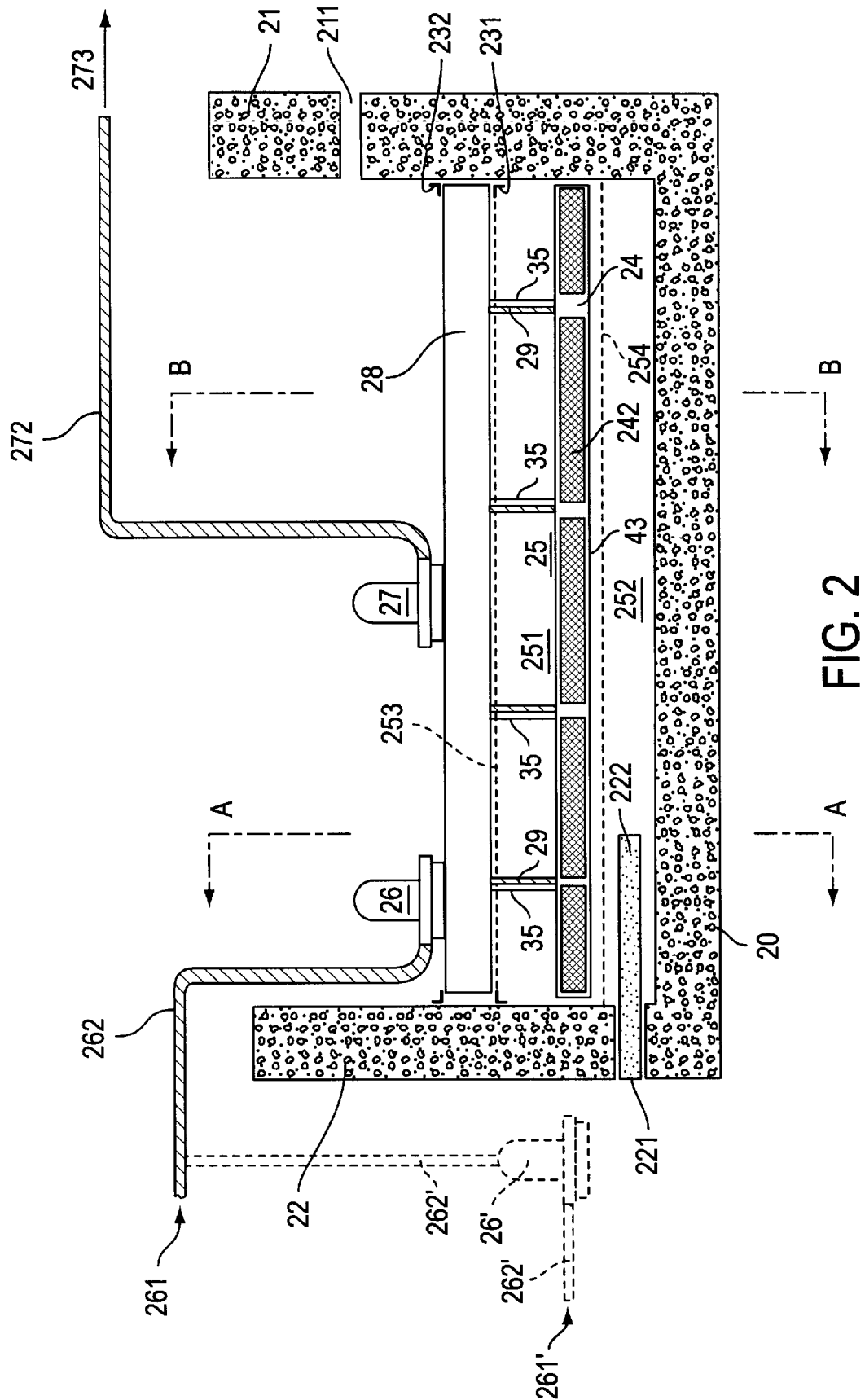
FIG. 2 shows a plan view of a traveling plenum section as installed in a filter.

In the preferred embodiment, filter construction is vastly simplified through the elimination of the complicated plenum and cell sections. FIG. 2 shows a plan view of a traveling plenum section as installed in a filter. An filter tank has slab 20, influent wall 21, and effluent wall 22. Influent wall 22 has one or more influent openings 211, and effluent wall 22 has one or more effluent openings 221. Blocking each effluent opening 221 is a cylindrical effluent plug 222 designed to permit filtered water to exit the effluent opening 221 while preventing filtration media 25 from exiting.

During filtration, influent water enters through influent openings 211, filters through fine filtration media 251 and coarse filtration media 252 (collectively referred to as media 25), and exits through effluent openings 221. The boundary between the fine and coarse filtration media 254 is preferably above the effluent plug 222 and below the traveling plenum 24. Fine filtration media 251 is used at the top of the filter to remove solids more effectively from the influent water, while slightly coarser filtration media is used to reduce headloss at the effluent openings. For example, fine filtration media 251 has a working diameter of 0.65 millimeters and coarse filtration media 252 has a working diameter of 1.00 millimeters.

Effluent plug 222 preferably is made using a perforated stainless steel sheet. The perforations may have straight line centers, staggered centers, or have an irregular pattern. The perforations should have a diameter that is smaller than the effective diameter of the coarse filtration media 252. This stainless steel sheet is rolled into a hollow tube with a diameter approximately the size of each effluent opening 221 and a length of preferably three feet. Each end of the tube may be capped with an additional piece of perforated stainless steel. The effluent plug 222 was designed to be sealed into each effluent opening and allow filtered water to pass outside of the filter but prevent media from exiting the filter.

The effluent plug was designed to reduce the headloss needed to have filtered water exit the effluent openings. Other methods, however, may be used to retain media inside the tank while allowing filtered water to exit. For example, a porous plate may be placed against each effluent opening to accomplish the same results with a higher headloss.

During the filtration process, solids are deposited on the surface of the media 253. These solids are periodically removed from the media via backwashing using a traveling plenum 24 having top porous plates 241, side porous plates 242, and sheet metal bottom 43. The traveling plenum will be described in more detail with reference to FIGS. 4, 5A, and 5B. Backwash water 261 is pumped through backwash water hose 262 by backwash water pump 26. The backwash water 261 travels through conduit pipes or hoses 29 into the traveling plenum 24. The backwash water is forced by the pump pressure through top porous plates 241 and side porous plates 242. Water going through top porous plates 241 is forced toward the surface of the media 253 and loosens the solids deposited at the surface of the media during the filtering cycle. Waste water pump 27, waste water pipe 274 (shown in FIGS. 3A and 3B), and washwater hood 28 remove the loosened solids and dirty backwash water through waste water hose 272 for cleansing in a waste water launder 273.

Backwash water 261 forced through top porous plates 241 and side porous plates 242 of the traveling plenum 24 fluidizes the media near the traveling plenum, reducing the effective media weight on and around the plenum and allowing the traveling plenum to glide through the media 25 relatively unimpeded. In the preferred embodiment, backwash water pump 26 is mounted on the washwater hood 28, along with waste water pump 27. The backwash water pump, however, may be located other places, such as outside the concrete tank. Backwash water pump 26' is shown near the effluent openings 221 of the filter with backwash water hose 262' channeling backwash water 261' into the pump and hose 262" extending over the effluent wall 22 to the washwater hood 28. Thus, backwash water pump 26' is located in much the same region as the backwater water pump shown in prior art FIG. 1.

The washwater hood 28 is supported on support angles 231 and secured by retention angles 232. Retention angles 232, however, are optional depending on the weight of the washwater hood 28 and the water pressure applied by backwash water pump 26 and waste water pump 27. Instead of using support angles, however, the washwater hood may ride on tracks 15 like those shown in prior art FIG. 1.

Figure 3A:
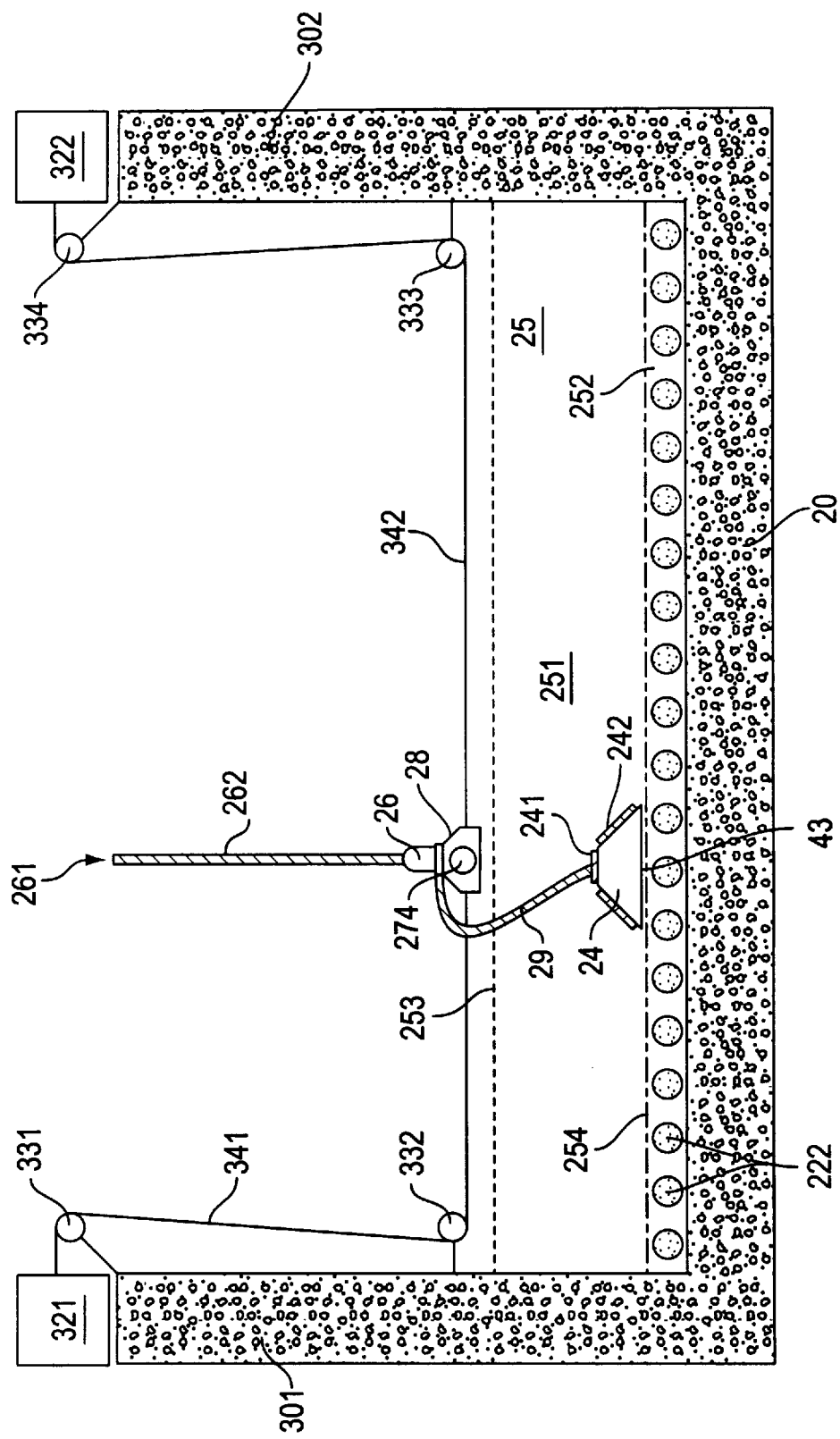
FIG. 3A shows a plan view of a traveling plenum section along intersection A—A shown in FIG. 2.

FIG. 3A shows a plan view of a traveling plenum section along intersection A—A shown in FIG. 2. Dual motors 321, 322 are mounted on top of end walls 301, 302. These motors may have a rack-and-pinion mechanism, a winch mechanism, a friction drive, or any other appropriate mechanism to move traveling plenum and washwater hood back and forth across the filter. Alternatively, a single reversible motor may be used instead of dual motors. A dual motor winch mechanism, however, is the preferred embodiment. Thus, cables 341, 342 attached to washwater hood 28 pull the hood and attached plenum across the entire surface area of the media as guided by pulleys 331, 332, 333, 334. Alternatively, tracks 15 like those shown in prior art FIG. 1 and motors mounted on the influent and effluent walls may be used to carry the washwater hood and attached traveling plenum across the filter.

Note that the washwater hood 28 does not necessarily have to be attached to traveling plenum 24. Instead, hood 28 may be independent of traveling plenum 24 and have a drive means as shown. Meanwhile, traveling plenum 24 may have a separate drive means and travel either in concert with the washwater hood, travel ahead of the hood, or travel behind the hood. Depending on the backwash mechanics of the filter, various traveling mechanisms and speeds may be implemented. For example, the speed of the hood and/or the traveling plenum may vary according to the amount of solids at the surface of the media or the position of the hood and/or traveling plenum in the filter.

Figure 3B:
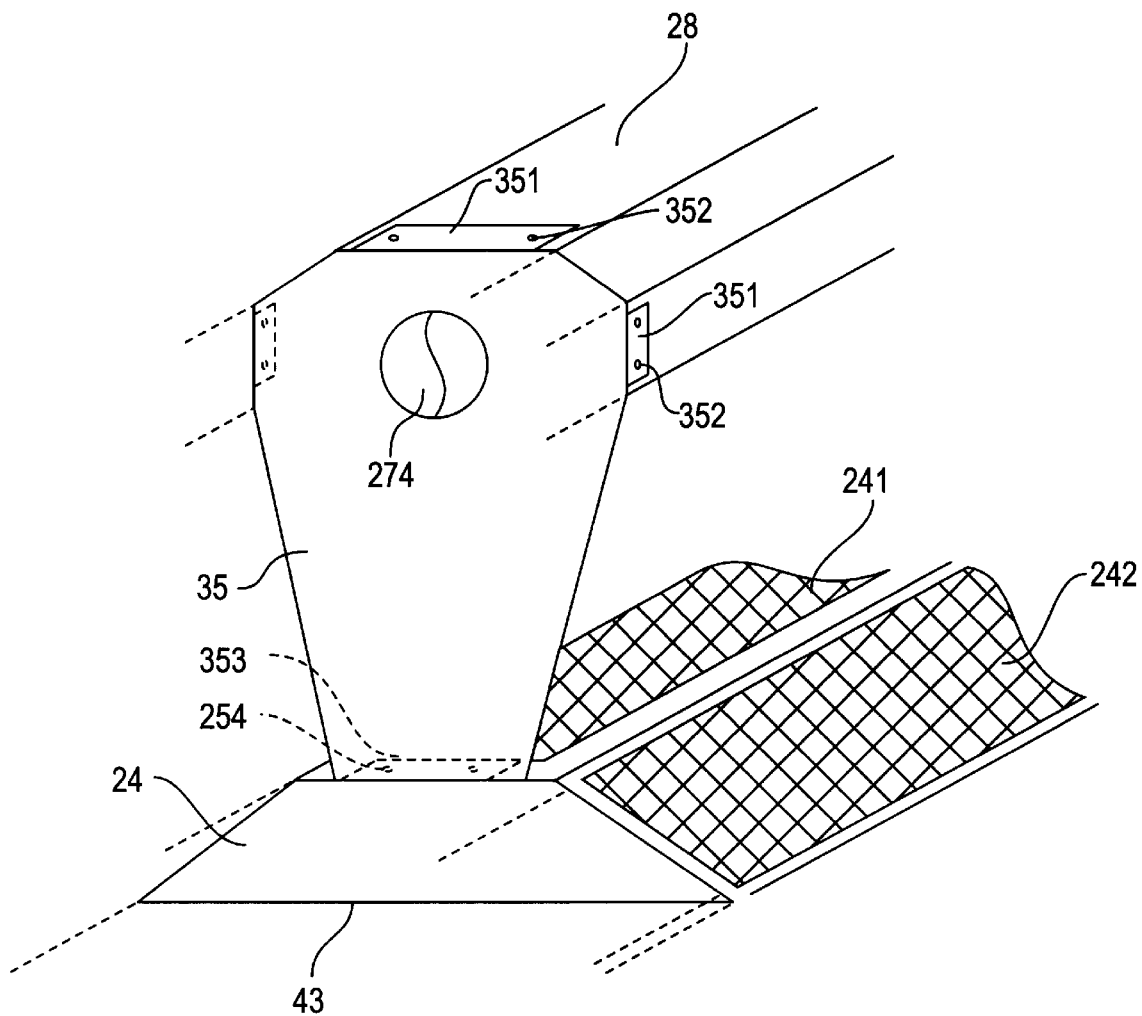
FIG. 3B shows a perspective view of a traveling plenum section attached to a washwater hood along intersection B—B shown in FIG 2.

FIG. 3B shows a perspective view of a traveling plenum section attached to a washwater hood along intersection B—B shown in FIG. 2. Support pieces 35 are preferably made of stainless steel. Several flaps 351 of the end support pieces are attached to washwater hood 28 using several bolts 352. Similarly, a bottom flap 353 of each support piece is attached to the traveling plenum 24 using bolts 354. Support pieces may be installed at various locations along the traveling plenum 24 as desired.

Figure 4:
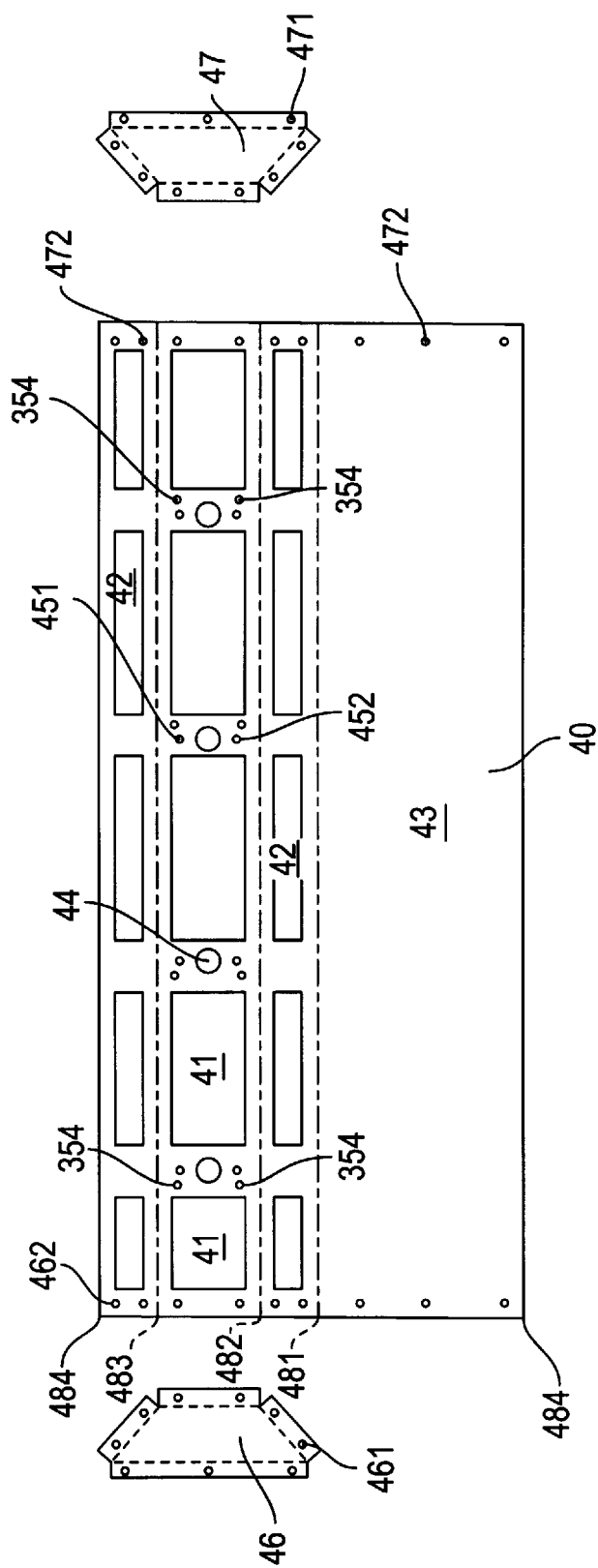
FIG. 4 shows details of the construction of the traveling plenum sheet metal.

FIG. 4 shows details of the construction of the traveling plenum sheet metal. Preferably, the traveling plenum is made of a single sheet of stainless steel with various top porous plates openings 41, side porous plates openings 42, conduit pipe or hose openings 44, and fastening bolts openings 451, 452. Main sheet 40 of the traveling plenum is approximately the width of the filter. Between the plate openings for the top porous plates, conduit holes 44 are pre-drilled to allow simplified insertion of conduit pipes or hoses 29 (shown in FIGS. 2 and 3A) into the traveling plenum 24. Pre-drilled bolt holes 451, 452 on either side of each conduit hole fix a conduit pipe or hose in each conduit hole. Of course, other types of attachments, such as welding or caulking, may be substituted for bolting. Other bolt holes, such as bolt holes 354 for attachment of support pieces 35 may also be pre-drilled.

In order to construct a traveling plenum 24 of the preferred trapezoidal shape, main sheet 40 is bent along lines 481, 482, 483 and welded along seam 484. Thus, the sheet metal bottom 43 of the traveling plenum 24 is formed. End caps 46, 47 complete the traveling plenum 24 and help the traveling plenum retain its shape. End caps 46, 47 preferably have several flaps for use in fastening the end caps to the main sheet 40 of the traveling plenum. Bolts may be inserted through bolt holes 461, 471 in each end cap and correspond to bolt holes 462, 472 in the main sheet 40.

The traveling plenum may have other cross-sectional shapes, such as diamond-shaped, circular, oval, or rectangular. Although a hydrodynamic cross section is preferred, any cross section may be acceptable as long as fluidization of the media through the top porous plates and the side porous plates adequately allows the traveling plenum to glide through the media.

Figure 5B:
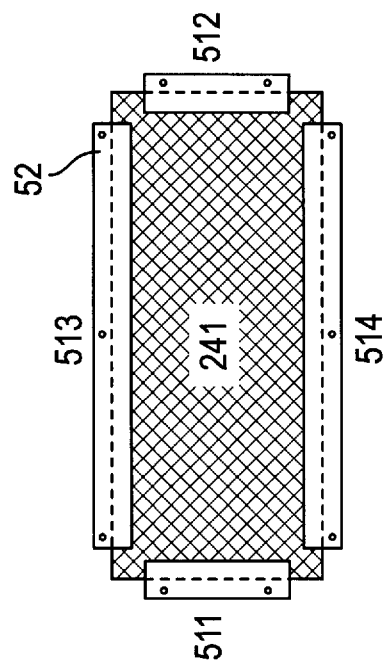
FIGS. 5A and 5B show details of the attachment of porous plates to the traveling plenum.
Figure 5A:
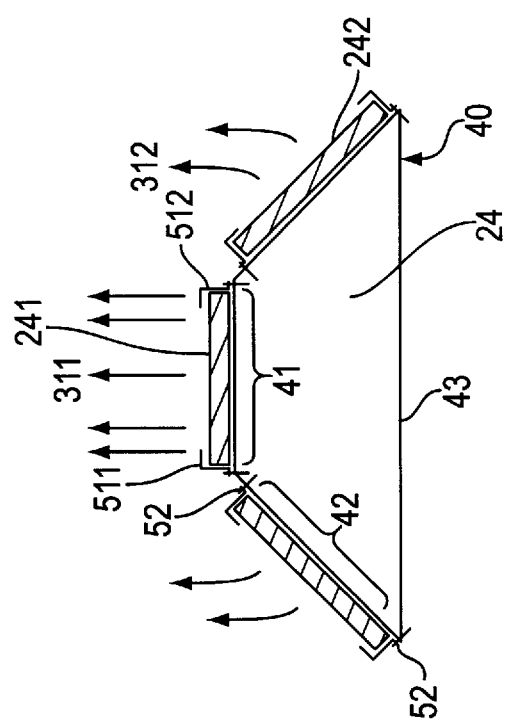

FIGS. 5A and 5B show details of the attachment of porous plates to the traveling plenum. Top porous plate 241 is caulked and sealed with adhesive to a lip of plate opening 41. Note that the plate openings are slightly smaller than the porous plate itself. Z-angles 511, 512, 513, 514 press and hold top porous plate 241 against lips of a plate opening 41 in the traveling plenum sheet metal. The Z-angles are also caulked and sealed to the porous plate. The Z-angles are then bolted using bolts 52 to the main sheet metal 40. Side porous plates 242 are attached to side plate openings 42 using Z-angles in a similar fashion.

Arrows 311, 312 show the flow of the backwash water from the porous plates. Side porous plates 242 allow flow 312 to fluidize the fine media around the traveling plenum 24 and allow ease of movement across the filter. Top porous plates 241 allow stronger flow 311 to loosen solids from the surface of the fine media during a backwash cycle. The porosity of the top and side plates may be individually adjusted to achieve the proper fluidizing and loosening flows along the length of the traveling plenum 24.

Figure 6:
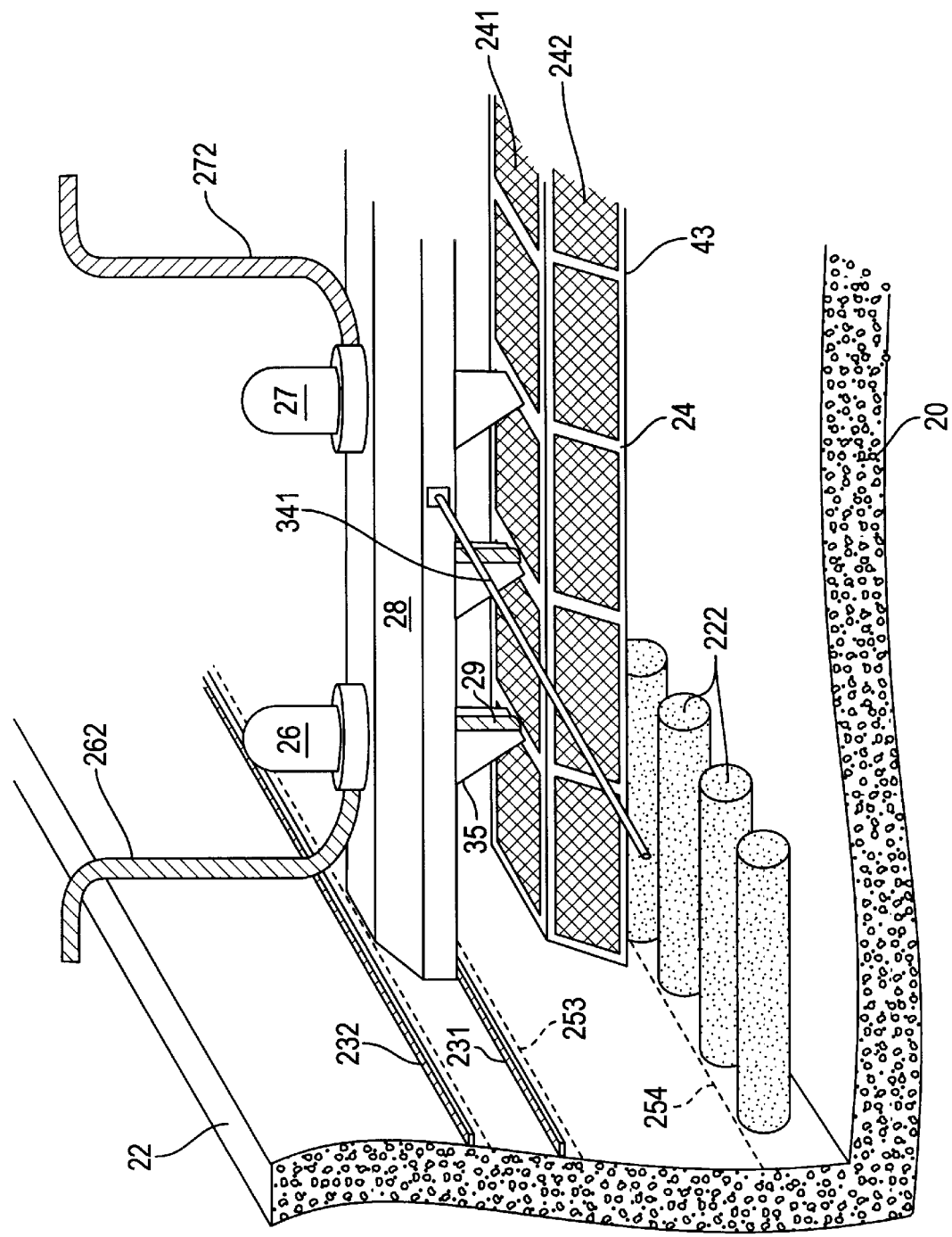
FIG. 6 shows a perspective view of a traveling plenum section as installed in a filter.

FIG. 6 shows a perspective view of the traveling plenum as installed in a filter. During the filtration process, influent water is delivered to the filter tank through influent openings in an influent wall (not shown). The water filters through fine granular filtration media, deposited between the surface of the media 253 and boundary 254, and coarse granular filtration media, deposited below boundary 254. The filtered water then exits through effluent plugs 222 installed in effluent openings (not shown) in the effluent wall 22 of the filter tank. The fine media enhances the deposit of solids at the surface of the media 253 while the coarse media and effluent plugs 222 reduce the headloss needed at the effluent openings.

During backwashing, backwash water pump 26 pumps backwash water from backwash water hose 262 through conduit pipes or hoses 29 into traveling plenum 24. The backwash water is forced through top porous plates 241 and side porous plates 242 up to the surface of the media 253. Solids deposited at the surface of the media during filtration are suspended in the backwash water and removed by washwater hood 28, waste water pump 27, and waste water hose 272 traveling on support angles 231 and retention angles 232.

Washwater hood 28 and traveling plenum 24 are attached to each other using support pieces 35. Cable 341 is attached to washwater hood 28 and is used to transport the mechanism along the tank. Fluidization of the media near the traveling plenum 24 by backwash water coming through side porous plates 242 allows the plenum to be transported relatively easily through the media.

Although the present invention and its advantages have been described in detail, it should be understood that various changes, substitution, and alterations can be made herein without departing from the spirit and scope of the invention as defined by the appended claims.

What is claimed is:

1. A filter comprising:
    a tank having an effluent wall;
    filtration media within the tank;
    an effluent opening in the effluent wall;
    an effluent plug across the effluent opening,
   wherein the effluent plug allows liquid to exit through the effluent opening, but retains the filtration media within the tank; and
    traveling plenum having a conduit with an opening and a porous plate mounted across the opening.

2. A filter according to claim 1, wherein the effluent plug comprises a perforated tube.

3. A filter according to claim 2, wherein an end of the perforated tube is capped.

4. A filter according to claim 1, wherein the effluent plug comprises a perforated metal tube.

5. A filtration system according to claim 1, wherein the filtration media comprises fine media and coarse media.

6. A filtration system according to claim 5, wherein the coarse media is installed from a bottom level of the tank to a level above the effluent plug.

7. A filtration system according to claim 5, wherein the fine media is installed at a level above the effluent plug.

8. A filter comprising:
    (A) a tank having an effluent wall with an effluent opening;
    (B) filtration media inside said tank;
    (C) a traveling plenum inside said tank for backwashing the filtration media;
    (D) a backwash water pump connected to said traveling plenum;
    (E) a waste water pump for pumping waste water out of said tank.

9. A filtration system comprising:
    a traveling plenum located beneath the surface of a filtration media and having a top opening in a conduit portion of said plenum and a top porous plate mounted across the top opening;
    a water supply connected to said traveling plenum;
    a washwater hood located above said filtration media;
    a waste water removal system connected to said washwater hood.

10. A filtration system according to claim 9, wherein the water supply further comprises:
    a pump for pumping backwash water into the conduit during a backwash cycle,
    wherein backwash water exits the conduit through the top porous plate.

11. A filtration system according to claim 9, wherein the traveling plenum further comprises:
    a side opening in the conduit; a side porous plate mounted across the side opening.

12. A filtration system according to claim 11, wherein the water supply further comprises:
    a pump for pumping backwash water into the conduit during a backwash cycle, wherein backwash water exits the conduit through the side porous plate.

13. A filtration system according to claim 9, further comprising
    the washwater hood attached to the traveling plenum; and
    a motor connected to the washwater hood for transporting the washwater hood and the attached traveling plenum.

14. A filtration system according to claim 9, further comprising:
    a mechanism connected to the washwater hood for transporting the washwater hood.

15. A filtration system according to claim 14, wherein the washwater hood and the traveling plenum are transported in concert.

16. A filtration system according to claim 14, wherein the washwater hood is transported behind the traveling plenum.

17. A filtration system according to claim 14, wherein the traveling plenum is transported behind the washwater hood.

18. A filtration system comprising:
    a traveling plenum having a conduit, wherein the plenum is located beneath the surface of a filtration media;
    a water supply connected to said traveling plenum;
    a washwater hood located above said filtration media;
    a waste water removal system connected to said washwater hood.

* * * * *